US009245098B2

(12) United States Patent
Yerli

(10) Patent No.: US 9,245,098 B2
(45) Date of Patent: Jan. 26, 2016

(54) PARENT-CHILD GUIDANCE SUPPORT FOR SOCIAL NETWORKS

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 41 days.

(21) Appl. No.: 13/766,723

(22) Filed: Feb. 13, 2013

(65) Prior Publication Data

US 2013/0219517 A1 Aug. 22, 2013

Related U.S. Application Data

(60) Provisional application No. 61/599,902, filed on Feb. 16, 2012.

(51) Int. Cl.
*G06F 7/04* (2006.01)
*G06F 21/31* (2013.01)
*H04L 29/06* (2006.01)

(52) U.S. Cl.
CPC .............. *G06F 21/31* (2013.01); *H04L 63/10* (2013.01)

(58) Field of Classification Search
CPC ................................. G06F 21/10; G06F 21/31
USPC ..................................................... 726/26–30
See application file for complete search history.

(56) References Cited

U.S. PATENT DOCUMENTS

| 2002/0049806 | A1  | 4/2002  | Gatz   |         |
|--------------|-----|---------|--------|---------|
| 2009/0183226 | A1  | 7/2009  | Dean   |         |
| 2011/0072039 | A1* | 3/2011  | Tayloe | 707/769 |
| 2011/0283311 | A1  | 11/2011 | Luong  |         |

FOREIGN PATENT DOCUMENTS

WO 01/88676 A2 11/2001

OTHER PUBLICATIONS

"Parental Controls," AOL.com, May 10, 2000, <http://web.archive.org/web/20000510204859/http://www.aol.com/info/parentcontrol.html> [retrieved Jun. 9, 2002], 2 pages.
European Search Report dated Jun. 11, 2013, in European Application No. 13155217.6, filed Feb. 14, 2013, 8 pages.
The First Office Action mailed Jun. 1, 2015, issued in corresponding Chinese Application No. 201310050798.6, filed Feb. 8, 2013, 35 pages.

* cited by examiner

*Primary Examiner* — Anthony Brown
(74) *Attorney, Agent, or Firm* — Christensen O'Connor Johnson Kindness PLLC

(57) ABSTRACT

The present disclosure relates to parent-child guidance support for social networks. A method for providing controlled access to an online resource via a child account comprises (a) when said child account is registered for said online resource, providing access to said online resource via said child account, and at least one of the following steps: (b) in response to a user request via said child account, registering said child account for said online resource only when an age specification of the child account is higher than an average age specification of user accounts currently registered for said online resource, and (c) when registering said child account for access to said online resource in response to a user request via said child account, also registering at least one parent account associated with said child account for said online resource.

20 Claims, 3 Drawing Sheets

PARENT-CHILD GUIDANCE SUPPORT FOR SOCIAL NETWORKS

CROSS-REFERENCE TO RELATED APPLICATION

This application claims the benefit of U.S. Provisional Patent Application No. 61/599,902, filed Feb. 16, 2012, the disclosure of which is incorporated by reference herein in its entirety.

FIELD

The present disclosure relates to a method, a system, and a server for providing controlled access to an online resource via a child account.

BACKGROUND

Modern online resources, e.g., social networks and online games, are not only accessed by adult users, but also by children. Social networks allow children to stay in contact, to share information with each other, and to gain access to online content that may, e.g., be useful for school. However, the online world also contains content that may not be appropriate for children. It is therefore desirable to provide a method for supporting a healthy and safe online experience for children.

In U.S. Pre-Grant Publication No. 2009/0183226 A1, it is suggested to allow parents to control with whom their child can engage in conversation while using online communication services. Parents may monitor potentially problematic communications between their child and other subscribers of the online communication service.

Moreover, U.S. Pre-Grant Publication No. 2002/0049806 A1 suggests to provide a child account for the child to access an access server and to associate the child account with a parent account in a family account. The user of the parent account may make selections to determine limitations for the child account associated with the family account.

SUMMARY

The present disclosure relates to a method, a system, and a server for providing controlled access to an online resource via a child account. The child account may be associated with at least one parent account. The online resource may, in particular, refer to an online social network or any activity therein. Various embodiments described herein allow parents to make the experience of online resources safer for their children and, in particular, allow a parent to control and monitor the child's access to an online resource in a flexible, comfortable, and reliable manner.

In a first aspect of the present disclosure, a method for providing controlled access to an online resource via a child account is provided, the child account including an age specification and further being associated with at least one parent account. The method comprises the step of:

(a) when said child account is registered for said online resource, providing access to said online resource via said child account;

and comprising at least one of the following steps:

(b) in response to a user request via said child account, registering said child account for said online resource only when the age specification of the child account is higher than an average age specification of user accounts currently registered for said online resource; and (c) when registering said child account for access to said online resource in response to a user request via said child account, also registering said at least one parent account associated with the child account for said online resource.

In the present disclosure, a child may wish to access an online resource like, e.g., an online chat within a social network. For accessing the online resource, the child may need to set up a child account. For setting up the child account, the child may be required to enter login information like, e.g., a user name, a password, and an age specification. Further, the child may be required to enter information regarding a parent email address or a parent account. For completion of the child account setup, it may be required that the parent confirms via the specified parent email address or the parent account that the child is allowed to set up the child account and that the child's age has been properly specified. Alternatively, the child account may be set up via the parent account as specified below.

When the child account has been registered for an online resource, e.g., by confirmation via the parent account, it will remain registered for that resource. This way, the child does not have to ask the parent each time he or she wants to, e.g., watch a specific video. Rather, the parent may approve access to that video once, whereupon the child account is registered for the video and the registration is stored, e.g., in the child account. The child may then access and watch the video any time he or she wants. Alternatively, the parent may specify a certain time of day during which the child may access that particular video. In some embodiments, the parent is provided, via the parent account, with an option to unregister the child account for an online resource for which the child account is currently registered.

The child account may be associated with a child while the parent account may be associated with an adult. The adult must not necessarily be the child's biological or foster parent, but may be any other person that is taking care of the child.

Alternatively, the child account may be associated with an employee and the parent account may be associated with his or her supervisor. In that case, the supervisor may manage and control the employee's access to online resources. In this scenario, the age specification may refer to a seniority level or a job grade of the employee. The terms "child account" and "parent account" also apply here as they refer to the dependency relationship of the accounts.

The child account may have limited access and limited options of available online resources and activities depending on how access settings of the child account have been chosen. In particular, the access settings of the child account may be set via one or more parent accounts associated with said child account. In some embodiments, a child account is associated with more than one parent account. In these embodiments, in particular, the child account may be monitored and/or controlled via one of the parent accounts associated with the child account or only based on an approval via all parent accounts associated with the child account. In some embodiments, a parent account is associated with two or more child accounts, allowing the user to control and monitor the child accounts via the parent account.

According to step (b), the child may only access an online resource via the child account, if the average age of users currently registered for said online resource is lower than the age specified in the child account. In that case, the average user of the online resource is younger than the child that wishes to access the online resource. It can thus be presumed that it is safe for the child to access the online resource. This way, the parent controlling the access of the child may base his or her decision of whether the child may be granted access on the decisions taken by other parents allowing their children access to said online resource. Access to the online resource is thus given based on an implicit age rating. The age specification may be given in the form of a birth date. Based on the specified birth date, the system may calculate a current age of the child.

According to the above method step (c), whenever the child requests to register for an online resource, the parent account associated with the child account will also be registered for the online resource. Hence, the parent accessing the system via the parent account will be informed of any online resource that the child wishes to register for and may, moreover, take part in it him- or herself. This way, the child account is set to a guidance mode, in which the parent may help and guide the child through his or her online experience. In some embodiments, when the online resource comprises an online chat, this may imply that the parent is able to monitor the child's conversation in the online chat and also to join that chat.

According to a representative embodiment, the method further comprises receiving via said parent account an indication of a first group of online resources for which step (b) is to be executed and/or an indication of a second group of online resources for which step (c) is to be executed. This allows the parent to determine for which type of online resources the implicit age rating of step (b) and for which type of online resources the parental guidance mode of step (c) is to be executed, e.g., the parent may decide that access to online resources that are encountered during usual internet browsing may be provided on an implicit age rating basis. The parent may additionally or alternatively decide that access to online resources like chats or online games requires the parental guidance of step (c). The indication of said first and/or second groups may be stored with said child account.

In a representative embodiment, the method further comprises creating, activating, managing, and/or inactivating said child account upon request via said parent account. In particular, the child account may only be created and set up on request by the parent via said parent account. This may comprise the parent creating a child account for his or her child. In some embodiments, the parent may activate or deactivate said child account via said parent account. This may, e.g., be used if the child has been naughty. In that case, the parent may decide to deactivate the child account for a certain period of time. In some embodiments, when deactivating the child account, the parent is allowed to preset a certain period of time for which the child account is to remain deactivated. In these embodiments, the system automatically reactivates the child account after the preset time has elapsed. In some embodiments, the parent is enabled to manage the child account, e.g., by registering the child account for a desired online resource as specified below. In some embodiments, the parent may also cause deletion of the child account by request via the parent account.

In a representative embodiment, said online resource comprises an online activity, an online content, a social network, an online game, and/or any activity therein. In particular, the online resource may comprise access to a social network or an online game as a whole. The term online resource may refer to a certain sub-area, application, or function within a social network or an online game. In some embodiments, the online resource may comprise an online library, a chat, a video chat, a homepage, an online shop, and/or an online activity, e.g., posting a comment, uploading an item, buying an item, downloading an item, etc.

According to a representative embodiment, in said step (b), said child account is registered for said online resource only when the age specification of the child account is at least a minimum age difference higher than an average age specification of user accounts currently registered for said online resource. This makes the online experience of the child even safer as the average current user of said online resource is younger than the child by said minimum age difference. In a further representative embodiment, said minimum age difference is one year or more, e.g., two years or, preferably, three years. Alternatively, the method may further comprise receiving an indication of said minimum age difference via said parent account. In this embodiment, the parent may choose and adjust the minimum age difference via the parent account as he or she wishes. In particular, the parent may decide to adjust said minimum age difference individually for each online resource.

In a representative embodiment, the method further comprises providing to a user, via said parent account, information about past accesses to said online resource via said child account. In these embodiments, whenever the child accesses the online resource via said child account, corresponding information is logged in a child activity protocol. Said child activity protocol may be sent to the parent account at set intervals, e.g., once a day. In some embodiments, the child activity protocol is stored online by an access server of the online activity to be viewed any time by a user via the parent account. Parents may view the activities of the child account in real time every time the child is online via the child account. In some embodiments, whenever the child is logged in via the child account, the parent may decide to join any activity of the child.

In a representative embodiment, the method further comprises:

(d) when a first user accesses said online resource via said child account, providing surveillance options for at least some activities within said access to a second user via said parent account, the surveillance options, in particular, comprising real-time surveillance of said activities.

The surveillance options may, in particular, comprise one or more screenshots (e.g., periodic screenshots), an event log, a video capture of the screen activities, a login time duration, a most recent login time, and/or a list of online resources that were accessed via the child account during a certain time interval.

In a representative embodiment, the method further comprises:

(e) when a first user accesses said online resource via said child account, providing control of at least some activities within said access to a second user via said parent account, the control, in particular, comprising a real-time control.

In particular, the method may allow the second user to enter data via his or her input device (e.g., a keyboard or mouse) that will be interpreted as an input by the child account, e.g., when the child accesses a chat via the child account, the parent may take over control of the chat activity via the parent account. In particular, the parent may use his or her keyboard to enter text that will be shown in the chat on behalf of the child. The text entered by the parent instead of the child may or may not be explicitly marked as such for the other users of that chat. In some embodiments, the second user is enabled to block the first user from entering any input via his or her input device (e.g., keyboard or mouse) to said online resource, e.g., when calling the child for dinner, the parent may decide to block the child from entering any text into an online chat that the child is currently taking part in.

In a representative embodiment, the method further comprises:

(f) upon request via the parent account, providing access to a further online resource via the child account, irrespective of the child account being registered for said further online resource.

For example, the parent may be allowed, via the parent account, to create interest graphs that are editable via the parent account, but are included in the child account. The child account may not be allowed to change any parts of the interest graph. In particular, the parent may, via the parent account, set the interest graph's permissions and any kind of other access settings related to the child account.

According to a representative embodiment, the method further comprises:

(g) providing access to a plurality of online resources via said child account based on at least one list of online resources editable via the parent account.

It is preferred that said at least one list comprises at least one of a first list (white list) indicating online resources to which access may be provided, a second list (black list) indicating online resources to which access may not be provided, and a third list (gray list), wherein access to any online resource on the third list is provided only after confirmation via said parent account. The white list, the gray list, and/or the black list may be stored in the child account. However, these lists are editable via the parent account only. The parent may add, delete, or modify any entries in these lists.

In a representative embodiment, said at least one list of online resources comprises, for each online resource on said list, a specification of at least one parameter associated with said online resource, wherein the method further comprises:

(h) providing access to one of said online resources on said at least one list via said child account only when a criterion based on the at least one parameter associated with said online resource is fulfilled.

In particular, for the child account, one or more access permission parameters may be set via the parent account. In some embodiments, the parameter is indicative of a time of day, a maximum duration, and/or a reward level. In particular, access to said online resource may only be provided if a current behavior level specified via the parent account matches said reward level associated with the online resource.

In some embodiments, the parents may set, via the parent account, a time of day, e.g., from 4 p.m. to 6 p.m., during which the child may access said online resource on the list. In particular, this time of day may be individually set for each online resource on the list. The parents may also be allowed to set a maximum duration of access for each online resource. For example, the parent may decide that the child is only allowed access to an online resource for one hour per day. According to the present disclosure, access to said online resource via the child account may be denied or even interrupted when said maximum duration has been reached. In some embodiments, after said maximum time duration has been reached, access to some online resources may be denied while access to other online resources may still be possible. This way, access to, e.g., an online game may be blocked after two hours of playing, while access to an online dictionary may still be possible.

In some embodiments, the parent may specify, via the parent account, a reward level associated with any of the online resources. For example, the parent may specify that the child is only allowed access to a certain online game if the child's grades at school are better than a preset grade. In this embodiment, a list of online resources with associated reward levels is stored. Moreover, the parent may enter a current reward level, e.g., a current grade at school via the parent account, and the child will only be granted access to the online resource when the current grade at least matches the preset grade for said online resource.

In a representative embodiment, the method further comprises:

(i) providing access to an online resource via said child account based on at least one attribute of said online resource and on a global setting corresponding to said attribute, wherein said setting is preferably entered via said parent account.

In these embodiments, parents may set which activities need approval, e.g., "new friend" requests may need the approval from a parent. Each online resource may have an attribute specifying the type of resource, e.g., the attribute may specify that the online resource refers to a "new friend" request or to video content. Via the parent account, the parent may choose that online resources carrying the attribute "video content" may not be accessed via the child account at all, while "new friend" requests are generally forwarded to the child account for acceptance or denial. Other attributes may refer to the resource belonging to a certain group, series or channel. In some embodiments, the attribute of an online resource is editable via the parent account.

In a representative embodiment, the method further comprises:

(k1) requesting access to an online resource via said child account;

(k2) forwarding said request to said parent account;

(k3) receiving a response to said request via the parent account; and (k4) when said request is granted via the parent account, providing access to said online resource via said child account.

In these embodiments, the child may request access to an online resource via the child account. The parent is then informed about the child's request via the parent account and may approve the activity at his or her discretion at any time. Until the access is approved, the online resource is not accessible via the child account. In some embodiments, any requests directed to the child account can be redirected to the parent account. In some embodiments, the request directed to the child account may be viewable by the child and/or the parent account. This request may, e.g., comprise a "new friend" request. The request is forwarded to the parent account and may only be approved via the child account after it has been approved via the parent account.

In some embodiments, the method further includes providing, via the child account, information about a control level set by the parent account. In these embodiments, the user of the child account can access information on what and how much control the parent account has. Display of this information can also be blocked by the parent without giving a notification to the child.

According to a representative embodiment, the method further comprises:

(l) receiving indication of at least one word or phrase via said parent account, wherein access to an online resource is provided via said child account only when said online resource or an input via the child account to said online resource does not contain said at least one word or phrase.

In these embodiments, the parent may enter or select words and phrases via the parent account that are blocked for the child to read or access, e.g., in postings. The parent may use one or more predefined lists to choose therefrom. The list may, e.g., be provided by the social network operator or by other users.

The method may further comprise:

(l') receiving indication of at least one word or phrase via said parent account; and blocking a message sent to said online resource via said child account when said message contains said at least one word or phrase.

In these embodiments, the parent may enter or select words and phrases via the parent account that are blocked for the child to use, e.g., in chats.

According to a representative embodiment, the method further comprises:

(m1) receiving, via a third account, a message directed to said child account;

(m2) sending said message to said parent account;

(m3) receiving an instruction from the parent account concerning said message; and (m4) processing said message based on said instruction.

In these embodiments, an incoming message directed to the child is first transmitted to the parent account. The parent may read the message and decide at his or her discretion whether the message should be received by the child. In some embodiments, the message may also comprise a "new friend" request.

According to a representative embodiment, the method further comprises disassociating said child account from said parent account in response to a request received via the parent account and/or in response to the age specification included by the child account passing a set threshold. In these embodiments, the parent may decide to give more liberty to his or her child by abandoning the association of the parent account with the child account. In some embodiments, the parent account is disassociated from the child account once the child reaches a certain age, e.g., 18 years. After disassociating the child account from the parent account, the child may access any online resource at any time without requesting access from the parent via the parent account. This may, e.g., comprise converting the child account into a regular user account.

In a second aspect, the present disclosure provides a computer program product including a computer-readable medium with computer-executable instructions that, when executed on a computing device, cause said computing device to perform the aforementioned method.

In a third aspect, the present disclosure provides a server configured to perform the aforementioned method.

In a fourth aspect, the present disclosure provides a system for providing controlled access to an online resource. The system comprises an access server being accessible through a user device and being adapted to provide access to said online resource, a user account database storing details of a plurality of user accounts including at least one child account, at least some user accounts including an age specification, logic for evaluating an average age specification of user accounts registered for said online resource, the access server being adapted, in response to a request by a user accessing the access server through said user device via said child account, to register said child account for said online resource based on said age specification of said child account and the average age specification evaluated by the logic.

The user device may, e.g., comprise a personal computer, a gaming console, a mobile telephone, or a handheld device. The access server may, in particular, be accessible via the Internet, a WLAN, and/or UMTS. In some embodiments, the access server hosts the online resource. Alternatively, the access server may be operatively coupled to a resource server hosting said online resource. The logic for evaluating an average age specification may, e.g., be included by the access server or by the resource server.

In a representative embodiment, the system further has means for storing said evaluated average age specification.

In a fifth aspect, the present disclosure provides a system for providing controlled access to an online resource. The system comprises an access server being accessible through a user device and being adapted to provide access to said online resource and a user account database storing details of a plurality of user accounts including at least one child account and at least one parent account associated with said child account. The access server is further adapted to register, in response to a request by a user accessing the access server through said user device via said child account, said child account and said at least one parent account associated with said child account, for said online resource.

Whenever the user accessing the system via the child account wishes to register for an online resource, both the child account and the associated parent account are registered for said online resource, e.g., whenever the child account is being registered for an online resource, the parent account is automatically registered for said online resource as well.

Further embodiments and benefits are specified in the following description in connection with the accompanying drawings.

DESCRIPTION OF THE DRAWINGS

The foregoing aspects and many of the attendant advantages of various embodiments of the present disclosure will become more readily appreciated as the same become better understood by reference to the following detailed description, when taken in conjunction with the accompanying drawings, wherein.

DETAILED DESCRIPTION

Figure 1:
FIG. 1 shows a screenshot of an example user interface provided to a user accessing a system via the parent account.

FIG. 1 depicts a screenshot of a user interface provided to a user accessing the system via the parent account. It shows the basic settings inside the parent account with regard to the child account associated with that parent account in area 100. In particular, any parent account may be associated with any number of child accounts. Each child account associated with a parent account may have different settings. In some embodiments, two or more parent accounts may be associated with a child account. A user accessing the system via one of the parent accounts associated with the child account may individually control the settings of the child account. When a child account is set up, it may include various standard settings like age rating, duration of online activities, a time limit, and/or a detailed list of online resources that the child account may have access to. These are shown and may be controlled in interface area 110. The list of activities may, in particular, comprise some activities that are always approved or confirmed. Other activities are marked as "pending." These activities will need confirmation by the parent via the parent account before the child may access the activity or online resource via the child account. Other activities may be altogether disabled, e.g., the user of the child account may not be granted access to these activities. "Confirmed" activities refer to online resources on a white list, "pending" activities refer to online resources on a gray list, and "disabled" activities refer to online resources on a black list.

Figure 2:
FIG. 2 shows a screenshot of a further example user interface provided to the user of the parent account allowing the user to monitor and control access via the child account.

FIG. 2 shows a screenshot of a further user interface provided to the user accessing the system via the parent account. Via the interface, the user of the parent account may monitor and control details of the child account. In particular, the user may create a new parent account in interface area 200. In a further area 210 of the interface, status data of the child accounts associated with the parent account are shown. The status data comprises the last login time, the login duration, the current status, and a remaining time before a maximum access duration is reached. The user interface further allows to review the past activities of the child account and to set access rules of the child account. Further, the user accessing the system via the parent account may delete the child account. In a further area 220 of the interface, the user is provided with a display of the pending requests via the child accounts. For example, the user of the parent account is informed that Child 1 wants to purchase a product X. The user may then either confirm or decline said request via the child account. Alternatively, the user may also put off a decision to a later time.

Figure 3:
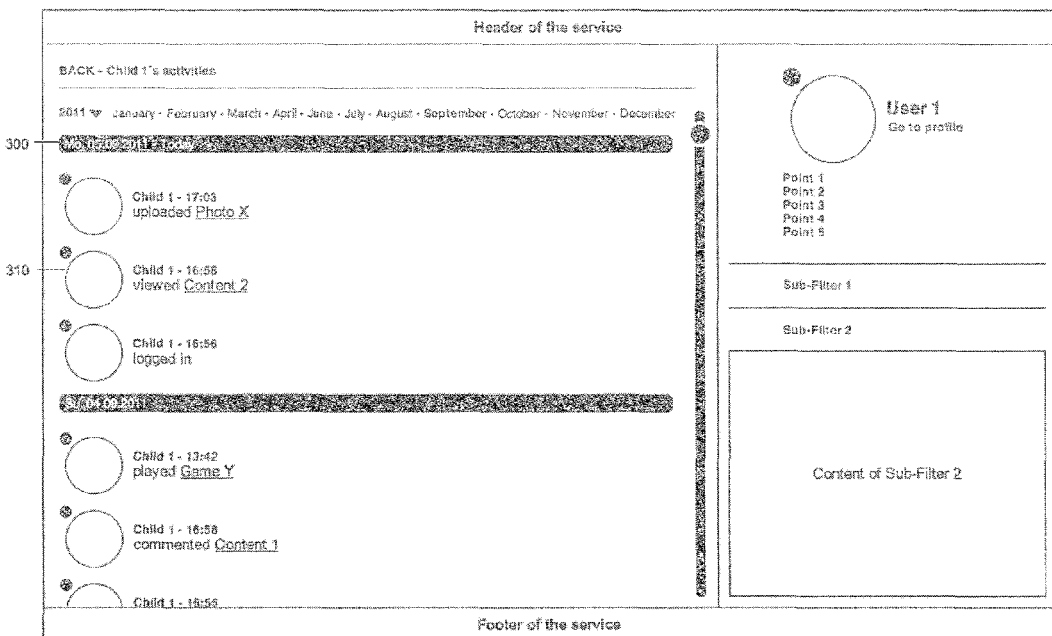
FIG. 3 shows a screenshot of a further user interface provided to the user of the parent account showing information about past online activities via the child account.

FIG. 3 depicts a screenshot of a further interface provided to the user accessing the system via the parent account. In the interface illustrated in FIG. 3, an activity protocol is shown. The user may access the activity protocol of each child account at any time and may even follow it in real time in interface area 300. The user is provided with a list of activities that the child recently performed or that the child performs right now, i.e., at the time that the user of the parent account watches the activity protocol. If an activity of the child account is still ongoing, the user of the parent account may join said activity. Further, the parent can watch any content that the child recently accessed in area 310 to check if the content's attributes like age rating, etc., have been properly declared.

The user logging in via the parent account may set any of the child accounts associated with that parent account to an implicit age rating. When the child account is set to the implicit age rating, the child requesting to be registered for an online resource will only be registered when the age specification of the child account is higher than the average age specification of the user accounts currently registered for that online resource. Moreover, the parent may set a minimum age difference via said parent account. In that case, the child account will only be registered for an online resource when the age specification of the child account is at least the minimum age difference higher than the average age specification of the user accounts currently registered for that online resource.

Alternatively or additionally, the parent may set, via the parent account, any child account associated with that parent account to a guidance mode. Whenever a user of the child account set to guidance mode is registered for an online resource, the parent account will be registered for that online resource as well, e.g., whenever the child registers for a group or a chat, the parent will also be registered for the group or chat, and may join any activity taken by the child therein. The parent may choose to set any child account associated with the parent account to the implicit age rating, to the guidance mode, to both, or to none.

Figure 4:
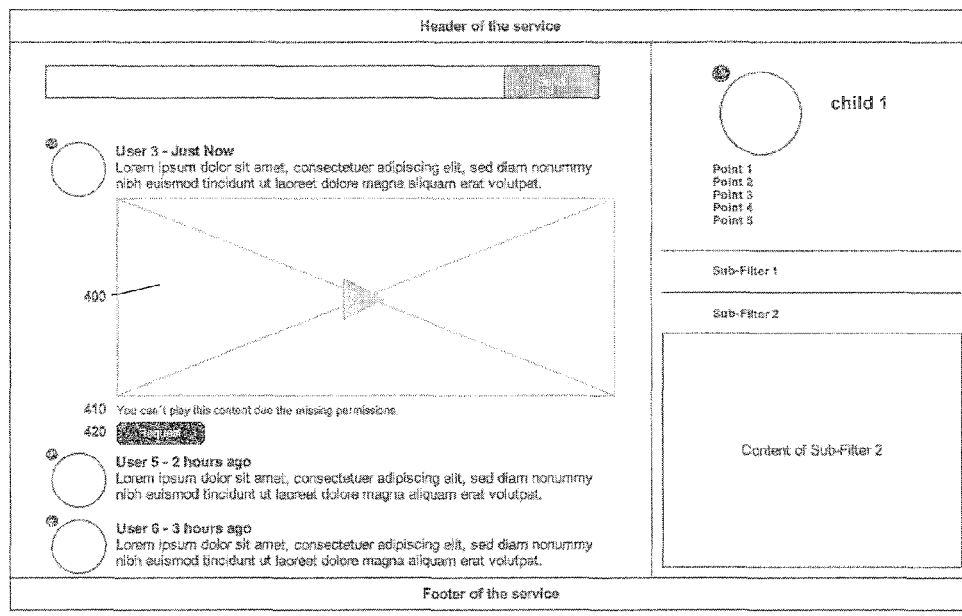
FIG. 4 shows a screenshot of a user interface provided to the user of the child account.

In FIG. 4, an interface provided to a user accessing the system via the child account is depicted. This interface refers to the participation of the child in a social network. In the interface, recent messages of other users like User 3, User 5, and User 6 are displayed. User 3 most recently posted a message containing video content 400. However, the video content is not shown in the interface provided to the user of the child account, as the child account has no permission to watch that kind of content; the age specification of the child account does not match the implicit age rating for that video. This may imply that the average age specification of users that are currently registered for that video is higher than the age specified in the child account of FIG. 4. Moreover, the user of the child account is informed that he cannot play this content due to the missing permissions 410. The user is provided with a button 420 labeled "Request," by which the child may send a request to the parent account associated with the child account, asking the parent for permission to access that content. When the parent is logged into the parent account, he or she will then see the child's request for access similar as shown in FIG. 2. The parent may then decide to confirm the child's request to watch that video. In that case, the child account is registered for the video and, simultaneously, the parent account is also registered for the video. The simultaneous registering of both the child and the parent accounts gives rise to parental guidance, which allows a safer online experience for the child.

Further, once the parent approves the child's request to watch the video, the child remains registered for that video, i.e., the child account remains registered for an online resource, as soon as it has been registered once.

Figure 5:
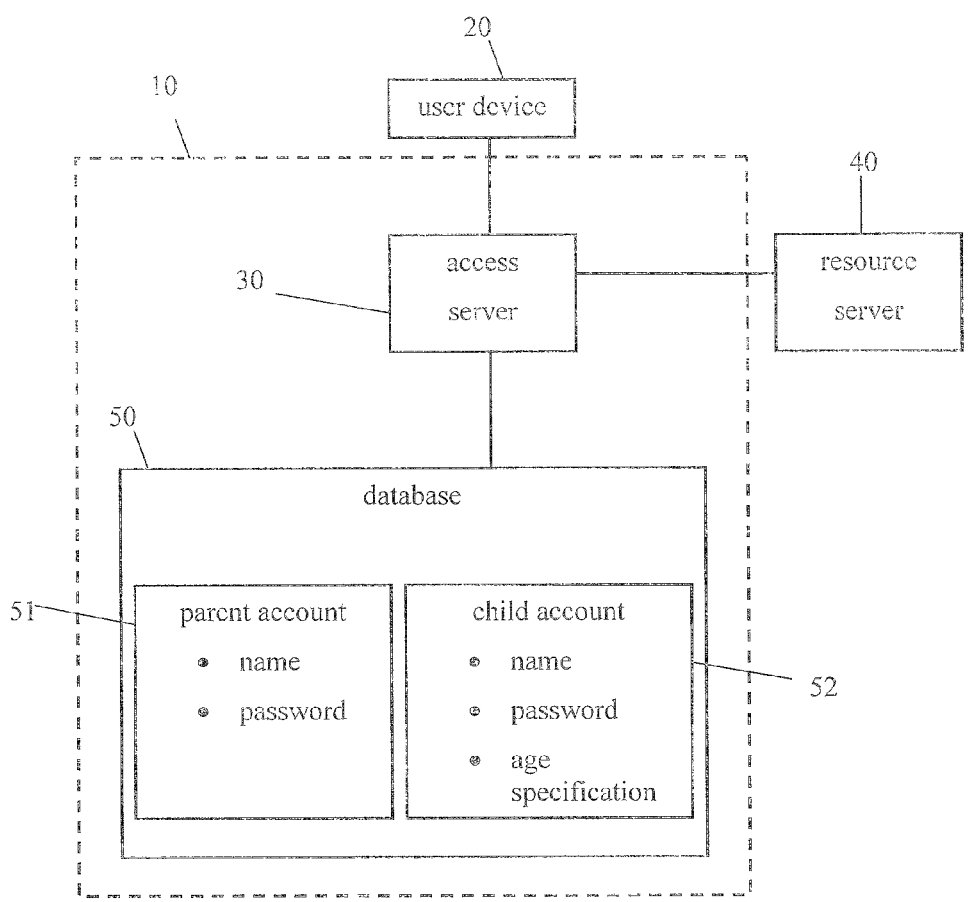
FIG. 5 shows a schematic drawing illustrating the system of the present disclosure.

FIG. 5 shows an example system 10 of the present disclosure. Whenever a user wishes to access an online resource hosted by a resource server 40, he or she will need to connect to an access server 30 of the system 10 through his or her user device 20. The user device may be, e.g., a PC, a handheld device, or a gaming console. The online resource may, e.g., comprise a chat in a social network. The access server 30 is coupled to resource server 40. When the user accesses the access server 30 through the user device 20, he or she will enter a login name and a password. The access server 30 is further coupled to a user account database 50 storing details of a plurality of user accounts. The access server 30 will compare the name and password entered by the user with the details of the user accounts stored in database 50 and will only provide access to the online resource hosted by resource server 40 if a corresponding user account is found and the password is verified. Further, access is only provided to the online resource based on details of that user account, e.g., only if the user account has previously been registered for said online resource.

The database 50 also stores details of the parent account 51 and the child account 52 of the present disclosure. The child account 52, in particular, includes an age specification. When a user accessing the access server 30 via said child account requests to be registered for said online resource, the access server 30 will only register the child account 52 for the online resource when the age specification of said child account 52 is higher than an average of age specifications of user accounts already registered for said online resource. The system further comprises logic (not shown) to evaluate the average age specification of user accounts currently registered for said online resource.

The system may further comprise one or more resource servers, each resource server hosting at least one online resource. The access server may further be coupled to one or more additional resource servers external to the system.

It is to be understood that many modifications may be provided to the exemplifying embodiments (e.g., embodiments, of the methods, the program products, or the systems described herein) without leaving the scope of the invention. Consequently, the invention may be practiced within the scope of the claims differently from the examples described. Also, the described features and characteristics may be of importance for the invention in any combination.

The embodiments of the invention in which an exclusive property or privilege is claimed are defined as follows:

1. A computer-implemented method for providing controlled access via a user device to an online resource hosted by a resource server via a child account, the child account including an age specification and further being associated with at least one parent account, the method comprising:
   (a1) when said child account is registered for said online resource, providing access to said online resource via said child account;
   (a2) evaluating an average age specification of a plurality of user accounts currently registered for said online resource;
   (b) in response to a user request to access the online resource via said child account, registering said child account for said online resource and providing access to the online resource only when the age specification of the child account is higher than the average age specification of the plurality of user accounts currently registered for said online resource; and
   (c) when registering said child account for access to said online resource in response to a user request via said child account, also registering said at least one parent account associated with said child account for said online resource.

2. The method of claim 1, further comprising:
   receiving via said at least one parent account an indication of a first group of online resources for which step (b) is to be executed and/or an indication of a second group of online resources for which step (c) is to be executed.

3. The method of claim 1, further comprising at least one of creating, activating, managing, and deactivating said child account upon request via said at least one parent account.

4. The method of claim 1, wherein in said step (b), said child account is registered for said online resource only when the age specification of the child account is at least a minimum age difference higher than an average age specification of user accounts currently registered for said online resource.

5. The method of claim 4, further comprising receiving an indication of said minimum age difference via said at least one parent account.

6. The method of claim 1, further comprising providing to a user, via said at least one parent account, information about past accesses to said online resource via said child account.

7. The method of claim 1, further comprising at least one of the following steps:
   (d) when a first user accesses said online resource via said child account, providing surveillance options for at least some activities within said access to a second user via said at least one parent account, the surveillance options comprising a real-time surveillance of said activities;
   (e) when a first user accesses said online resource via said child account, providing control of at least some activities within said access to a second user via said at least one parent account, the control comprising a real-time control; and
   (f) upon request via the at least one parent account, providing access to a further online resource via the child account, irrespective of said child account being registered for said further online resource.

8. The method of claim 1, further comprising:
   (g) providing access to a plurality of online resources via said child account based on at least one list of online resources editable via the at least one parent account.

9. The method of claim 8, wherein said at least one list comprises at least one of a first list indicating online resources to which access may be provided, a second list indicating online resources to which access may not be provided, and a third list, wherein access to any online resource on the third list is provided only after confirmation via said at least one parent account, or wherein said at least one list of online resources comprises, for each online resource on said list, a specification of at least one parameter associated with said online resource, and wherein the method further comprises:
   (h) providing access to one of said online resources on said at least one list via said child account only when a criterion based on the at least one parameter associated with said online resource is fulfilled.

10. The method of claim 9, wherein the at least one parameter is indicative of a time of day, a maximum duration, and/or a reward level, wherein access to said online resource is provided only when a reward level specified via said at least one parent account matches said reward level associated with said online resource.

11. The method of claim 1, further comprising:
   (i) providing access to an online resource via said child account based on at least one attribute of said online resource and on a global setting corresponding to said attribute, wherein said setting is preferably entered via said at least one parent account.

12. The method of claim 1, further comprising:
   (k1) requesting access to an online resource via said child account;
   (k2) forwarding said request to said at least one parent account;
   (k3) receiving a response to said request via said at least one parent account; and
   (k4) when said request is approved via said at least one parent account, providing access to said online resource via said child account.

13. The method of claim 1, further comprising:
   (l) receiving indication of at least one word or phrase via said at least one parent account, and wherein access to an online resource is provided via said child account only when said online resource does not contain said at least one word or phrase; or
   (l') receiving indication of at least one word or phrase via said at least one parent account, and blocking a message sent to said online resource via said child account when said message contains said at least one word or phrase.

14. The method of claim 1, further comprising:
   (m1) receiving, via a third account, a message directed to said child account;
   (m2) sending said message to said at least one parent account;
   (m3) receiving an instruction from said at least one parent account concerning said message; and
   (m4) processing said message based on said instruction.

15. The method of claim 1, further comprising disassociating said child account from said at least one parent account in response to a request received via the at least one parent account and/or in response to the age specification included by the child account passing a set threshold.

16. A system for providing controlled access to an online resource, the system comprising:

an access server being accessible through a user device and being adapted to provide access to said online resource;

a user account database storing details of a plurality of user accounts including at least one child account, at least some of the user accounts including an age specification; and evaluation logic adapted to evaluate an average age specification of a plurality of user accounts currently registered for said online resource, wherein the access server is further adapted, in response to a request to access the online resource by a user accessing the access server through said user device via said child account, to register the child account for said online resource and to provide access to the online resource based on said age specification of said child account and said average age specification of the plurality of user accounts currently registered for said online resource evaluated by said logic.

17. The system of claim 16, wherein said online resource comprises online content, a social network, an online game, and/or any activity therein.

18. The system of claim 16, wherein the access server is further adapted to register said at least one child account for said online resource only when the age specification of the at least one child account is at least a minimum age difference higher than said evaluated average age specification, and to adjust said minimum age difference on request by a user via a parent account associated with said at least one child account.

19. The system of claim 16, further comprising means for storing said evaluated average age specification.

20. A system for providing controlled access to an online resource, the system comprising:

an access server being accessible through a user device and being adapted to provide access to said online resource;

a user account database storing details of a plurality of user accounts including at least one child account and at least one parent account associated with said child account; and evaluation logic adapted to evaluate an average age specification of a plurality of user accounts currently registered for said online resource, wherein the access server is further adapted, in response to a request to access the online resource by a user accessing the access server through said user device via said child account, to register the child account for said online resource and to provide access to the online resource based on said age specification of said child account and said average age specification of the plurality of user accounts currently registered for said online resource evaluated by said logic, wherein the access server is further adapted to register, in response to a request by a user accessing the access server through said user device via said at least one child account, said at least one child account and said at least one parent account associated with said at least one child account, for said online resource.

\* \* \* \* \*